United States Patent [19]

Axenko et al.

[11] 4,349,431
[45] Sep. 14, 1982

[54] APPARATUS FOR ELECTROCHEMICAL PURIFICATION OF CONTAMINATED LIQUIDS

[76] Inventors: Alexandr A. Axenko, ulitsa Bairona, 152, kv. 25; Miron M. Nazarian, ulitsa Bljukhera, 13, kv. 138; Vladimir A. Kolyada, Petrozavodskaya ulitsa, 91-a, kv. 30; Arkady R. Mataev, ulitsa Timurovtsev, 19, kv. 130, all of Kharkov, U.S.S.R.

[21] Appl. No.: 184,424

[22] Filed: Sep. 5, 1980

[51] Int. Cl.³ .............................................. C02F 1/46
[52] U.S. Cl. ..................................... 204/302; 204/186
[58] Field of Search ............... 204/302, 304, 305, 306, 204/307, 308, 186, 188

[56] References Cited
U.S. PATENT DOCUMENTS 3,505,188 4/1970 Pan ...................................... 204/149

Primary Examiner—Delbert E. Gantz
Assistant Examiner—William Leader
Attorney, Agent, or Firm—Robert E. Burns; Emmanuel J. Lobato; Bruce L. Adams

[57] ABSTRACT

An apparatus for electrochemical purification of contaminated liquids comprises a settling chamber having an outlet pipe for pure liquid and communicating with an electrocoagulation chamber having an inlet pipe for contaminated liquid and an inlet pipe for electrolyte to be supplied thereto. The lower part of the electrocoagulation chamber is provided with a system of soluble electrodes set up within the same part while the upper part of the settling chamber is provided with a system of insoluble electrodes set up lower than the open end of the electrocoagulation chamber. Above the insoluble electrodes there is a distributor having orifices and passages for the liquid to flow from the electrocoagulation chamber to the settling chamber and for foam and a gas to leave the same chambers.

7 Claims, 2 Drawing Figures

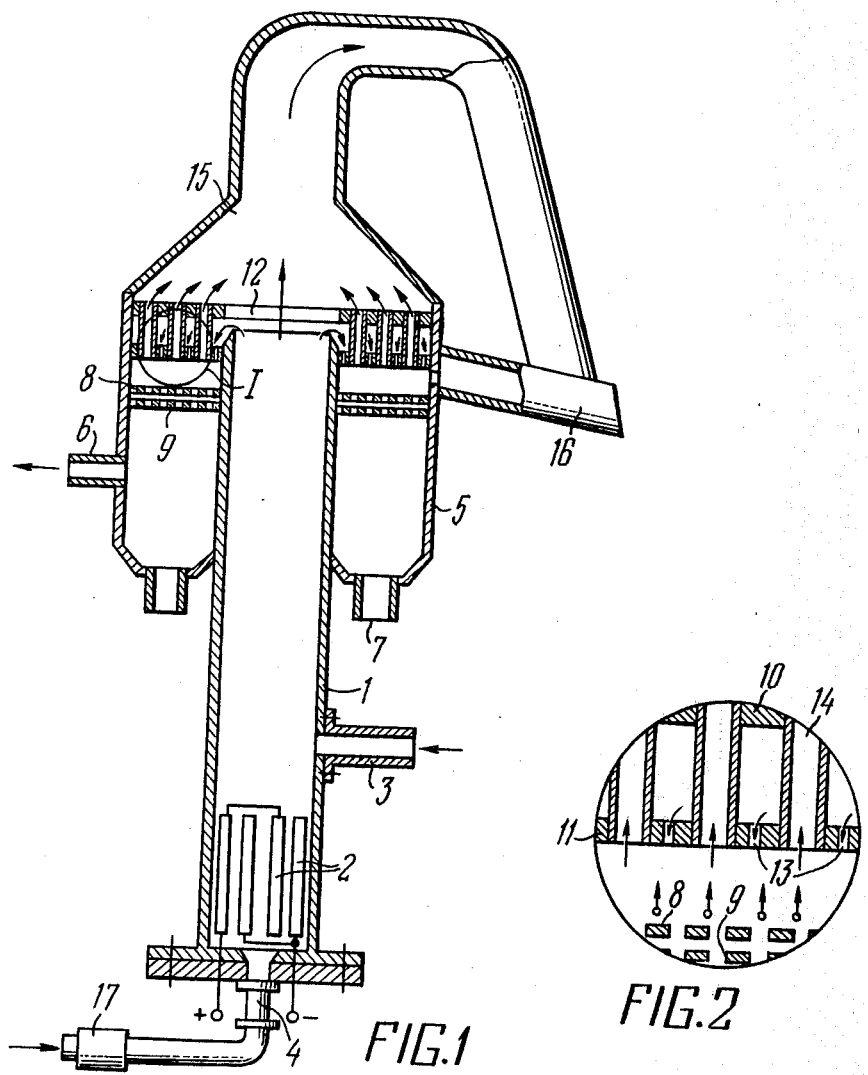

APPARATUS FOR ELECTROCHEMICAL PURIFICATION OF CONTAMINATED LIQUIDS

BACKGROUND OF THE INVENTION

1. Field of the Invention

This invention relates to apparatus for purifying contaminated liquids and, more particularly, to apparatus for electrochemical purification of contaminated liquids. The invention is useful in purifying a liquid contaminated with an organic matter, mechanical admixtures, surfactants and so on. The instant invention is best suited for purifying liquids contaminated with petroleum cuts, such as waste waters containing polymers, oils, and greases.

2. Description of the Prior Art

Among the prior art apparatus for purifying contaminated liquids apparatus for electrochemical purification of liquids are finding ever increasing application due to a wide scope of processing offered by these apparatus and in particular the apparatus for practicing the electroflotation and the electrocoagulation methods.

Known in the art are apparatus for batch and continuous electrochemical purification of liquids. The latter type appears to be more promising.

A prior art apparatus for electrochemical purification of contaminated liquids (USSR Inventor's Certificate No. 407.844) comprises a settling chamber communicating with an electrocoagulation chamber disposed within the settling chamber, both supplied with electrolyte. The electrocoagulation chamber has soluble electrodes and an inlet pipe for contaminated liquid, disposed under these electrodes. The settling chamber is provided with an outlet pipe for a pure liquid. In the process of purification, the contaminated liquid together with electrolyte additions (NaCl, HCl) passes the soluble electrodes which are energized. The metal of the soluble electrodes forms hydroxides which coagulate the impurities present in the contaminated liquid. The liquid passes from the electrocoagulation chamber to the settling chamber where sludge separates from the liquid, and both the sludge and the liquid are discharged by way of different flow paths. When the liquid being purified passes by the electrodes, it contaminates them, which speeds up the passivation of the electrodes and, hence affects the performance of the purification process and necessitates frequent cleaning of the electrodes and, finally, performance of the apparatus is impaired.

Known in the art is an apparatus (Japanese patent publication No. 52-14397) wherein the coagulation chamber is used only to produce a coagulating agent by supplying pure electrolyte thereinto, while the purification process is carried out in another chamber which is supplied with contaminated liquid to produce a mixture with the electrolyte containing the coagulating agents and supplied from the electrocoagulation chamber.

Such arrangement provides for a substantial reduction in deposits on the electrodes. However, the coagulating and flotating capacity of the electrodes is inadequately used in that the process of producing coagulating agents and passage of the electrolyte containing these agents from the electrocoagulation chamber to the settling chamber is accompanied by forming the coagulating agents into aggregates (hydroxides of the metal of the soluble electrodes and gas bubbles forming on the surface of the soluble electrodes), which leads to a decrease in the specific surface and, consequently, in coagulation and flotation capacity of the electrodes.

Known in the art is an apparatus for electrochemical purification of waste waters (USSR Inventor's Certificate No. 644,378), comprising a settling chamber with an electrocoagulation chamber coaxially disposed within the same settling chamber. The apparatus is provided with inlet and outlet pipes for water, an inlet pipe for the supply of electrolyte into the electrocoagulation chamber.

In the lower portion of the electrocoagulation chamber there are soluble electrodes producing ions of their metal under the action of an electric current, which ions attach to the hydrolyzates and form metal hydroxides.

The metal hydroxide is carried up by gas bubbles from the interelectrode space to the zone of supply of contaminated liquid into the electrocoagulation chamber, and by contacting the impurities thereof it coagulates them into aggregates which are carried up along the electrocoagulation chamber.

In such an apparatus the impurities of contaminated liquid are coagulated with an excess quantity of metal hydroxides. A part of them does not manage to react with the impurities of the contaminated liquid, so it is mixed with foam and discharged from the apparatus. The other part of the hydroxide, some 7 to 18%, which does not react with the impurities of the contaminated liquid, flows together with the liquid from the electrocoagulation chamber to the settling chamber and being entrained by the flowing liquid leaves the apparatus. Some impurities, along with the hydroxides, find their way to the settling chamber as well. The liquid flows to the settling chamber directly along the surface of the electrocoagulation chamber and further takes the volume of the settling chamber mostly in the lower and the middle portion thereof. Such quantity of, about 10 to 20 mg/l, metal hydroxides impairs performance of the liquid purification process and increases specific consumption of the electrodes and power.

SUMMARY OF THE INVENTION

The main object of the invention is the provision of an apparatus for electrochemical purification of contaminated liquids, offering a more uniform distribution of the liquid being treated in the settling chamber.

Another object of the invention is the provision of an apparatus of the kind referred to, ensuring a more intensive flotation of admixtures and metal hydroxides of the metal of the soluble electrodes which flow to the settling chamber.

A further object of the invention is an improved purification of liquids.

These and other objects of the invention are achieved by providing an apparatus for electrochemical purification of contaminated liquid, comprising a settling chamber having an outlet pipe for pure liquid and communicating with an electrocoagulation chamber having an inlet pipe for contaminated liquid and an inlet pipe for electrolyte to be supplied thereto, and a system of soluble electrodes set up in the lower portion of the electrocoagulation chamber, wherein, according to the invention, within the upper portion of the settling chamber there is provided a system of insoluble electrodes set up lower than the open end of the electrocoagulation chamber, while above the electrodes there is a distributor having orifices and passages for the liquid to flow from the electrocoagulation chamber to the settling chamber and for foam and a gas to leave the same chambers.

The insoluble electrodes in the upper portion of the settling chamber furnish the release of gas bubbles which carry the metal hydroxides and the remaining admixtures to the surface of the liquid where they are held entrapped in foam arising in the purification process and with the liquid flowing from the electrocoagulation chamber to the settling chamber and then out of the apparatus.

The distributor preferably comprises two baffle plates, each having orifices evenly distributed thereover and pipe sections extending through the baffle plates and letting foam and gas escape from the settling chamber, one of the baffle plates being arranged above the open end of the electrocoagulation chamber and having an opening over the electrocoagulation chamber for foam and gas to leave this chamber, while the other baffle plate is arranged lower than the open end of the electrocoagulation chamber and has orifices alternate with the pipe sections and intended to let the liquid pass from the electrocoagulation chamber to the settling chamber.

Such a distributor makes it possible to evenly distribute the liquid flowing from the electrocoagulation chamber over the cross section of the settling chamber at the upper portion thereof as well as to simultaneously evacuate foam from the settling chamber as soon as the foam gets into this chamber with the liquid flowing thereto.

BRIEF DESCRIPTION OF THE DRAWINGS

The invention will be described in more detail with reference to the accompanying drawings, in which:

FIG. 1 is a sectional view of an apparatus for electrochemical purification of contaminated liquids in accordance with the invention;

FIG. 2 is an enlarged fragmentary view taken at I in FIG. 1.

DESCRIPTION OF THE PREFERRED EMBODIMENT

An apparatus for electrochemical purification of contaminated liquids comprises an electrocoagulation chamber 1 constructed as a tubular shape with a system 2 of soluble electrodes disposed within the lower portion thereof, as well as an inlet pipe 3 for contaminated liquid and an inlet pipe 4 for electrolyte.

The inlet pipe 3 for contaminated liquid is above the system 2 of soluble electrodes, while the inlet pipe 4 for electrolyte is lower than the system 2 of soluble electrodes. The upper portion of the electrocoagulation chamber 1 is received within a settling chamber 5.

The settling chamber 5 has an outlet pipe 6 for pure liquid, as well as an outlet pipe 7 for the sludge that may accumulate in this chamber.

In the upper portion of the settling chamber 5 at the level below the upper end of the electrocoagulation chamber 1 there is provided a system of insoluble electrodes which are perforated plates 8 and 9 made from stainless steel, one of which is connected to the positive terminal of a power source (not shown), while the other one is connected to the negative terminal of the same power source. Above these plates there is a distributor having two baffle plates 10, 11 extending over the cross-section of the chamber 5. The upper baffle plate 10 is above the open end of the electrocoagulation chamber 1 and has an opening 12 over and in registry with the electrocoagulation chamber 1 to provide for evacuation of the process foam and gas therefrom.

The lower baffle plate 11 is arranged lower than the open end of the electrocoagulation chamber 1 and has orifices 13 which are evenly distributed over the plate to offer passage of the liquid from the electrocoagulation chamber 1 to the settling chamber 5.

The upper 10 and the lower 11 baffle plates are coupled by pipe sections 14 which are disposed alternate with the orifices 13 and serve as passages for foam from the settling chamber 5 when the foam originating from the flotation process gets into this chamber with the liquid being purified.

Above the distributor there is an arrangement 15 for evacuation of the foam and gas from the apparatus. The arrangement 15 communicates with a pipe 16 which in turn serves to lead away from the settling chamber 5 some admixtures separated from the liquid due to settling, oil for example.

Electrolyte is supplied to the electrocoagulation chamber 1 through the pipe 4 by an ejector 17 or a pump. The pure liquid from this same apparatus may sometimes serve as electrolyte.

The apparatus functions as follows.

The electrocoagulation chamber 1 and the settling chamber 5 are filled with electrolyte (e.g. process water containing admixtures of an hydrochloric acid and sodium chloride) by means of the ejector 17.

Voltage is applied to the system 2 of soluble electrodes and the system of insoluble electrodes consisting of the perforated plates 8 and 9. In 25 to 30 seconds contaminated liquid is supplied through the pipe 3 and into the electrocoagulation chamber 1. The electric current flows through the electrodes and induces the formation of gas (hydrogen) on the surface of the electrodes, which gas carries the metal hydroxide from the interelectrode spacing to the zone of supply of the contaminated liquid. The hydroxides coagulate the impurities, which are in a colloid state in the contaminated liquid, to form aggregates. The aggregates then are carried by the gas bubbles along the electrocoagulation chamber 1 and leave the same through the opening 12 as foam.

Thus treated liquid containing aggregates of coagulated impurities, metal hydroxide and some foamy residue, overflows the upper end of the electrocoagulation chamber 1 and enters the space between the baffle plates 10, 11 of the distributor. The liquid flows over the lower baffle plate 11 then through the orifices 13 in this plate and further into the settling chamber 5 where it is evenly distributed over the cross-section of the chamber 5. As the liquid flows through the system of insoluble electrodes, consisting of the perforated disks 8,9, metal hydroxides, residual impurities and foam are carried up by the gas bubbles released from these electrodes and as foam pass through the pipes 14 onto the upper baffle plate 10 and through the arrangement 15 and are lead away from the apparatus.

The liquid fraction of the foam, for example oil, accumulates on the surface of the liquid in the settling chamber 5 and flows by gravity through the pipe 16 away from the apparatus.

The sludge that has accumulated in the process is evacuated through the pipe 7.

If the liquid under treatment contains dissolved oils, greases, petroleum cuts, polymers, surfactants, it is advisable to add electrolytes to the liquid which decreases chemical stability of the emulsions and colloids.

In this case the pure liquid from the settling chamber 5 may be used as electrolyte supplied to the electrocoagulation chamber through the pipe 4.

The system of insoluble electrodes and the distributor in the settling chamber 5 make it possible to improve performance of the purification process due to a decrease in the content of admixtures, the metal hydroxides among them, in the treated liquid.

Example. An apparatus comprising an electrocoagulation chamber 1 shaped as a tube of 0.3 m in diameter and 3.0 m high, whose lower portion houses 10 (ten) pairs of aluminum plate electrodes 2 with an overall active surface of 3 m² and disposed at a distance of 0.6 m from an inlet pipe 3 for supplying contaminated liquid. The cathode and the anode of each pair are spaced 10 mm apart. The apparatus also comprises a cylindrical settling chamber 5 having a 1 m diameter and a 1.2 m height and disposed 0.5 m lower than the end of the electrocoagulation chamber 1. A system of insoluble electrodes shaped as perforated disks 8, 9 is made from stainless steel and spaced 12 mm from each other.

Above these there is a distributor consisting of baffle plates 10 and 11 coupled by means of pipes 14.

Direct current of 12 V and 10 mA/cm² was applied to the system of the soluble electrodes 2, while direct current of 12 V and 6 mA/cm² was applied to the system of insoluble electrodes.

Waste water such as concentrated cutting fluid containing from 3 to 5 g/l of admixtures was treated. Such waste water is an "oil-in-water" emulsion stabilized by various emulsifying agents and stable in an aggregate state, and requires a long period of time to settle.

With a power consumption of 2.0 to 2.2 kW.h/m³ and 85 to 100 g/m³ the apparatus' throughput was 6.0 to 7.0 m³/h. The treated liquid contained from 18 to 25 mg/l of admixtures and from 8 to 10 mg/l of aluminum hydroxide.

The liquid, treated in the apparatus constructed according to the teaching of the USSR Inventor's Certificate No. 644,738, contained 45 to 55 mg/l of admixtures and 27 to 30 mg/l of aluminum hydroxide.

In order to complete the purification process, thus treated liquid was passed through three filters in series with beds of quartz sand each 1.2 m, 1.0 m, and 0.8 m—thick, respectively.

What is claimed is:

1. An apparatus for electrochemical purification of contaminated liquid comprising: an electrocoagulation chamber having an inlet pipe for feeding contaminated liquid into the chamber and another inlet pipe for feeding electrolyte into the chamber, a system of energizable soluble electrodes within a lower portion of the electrocoagulation chamber, said electrocoagulation chamber having an upper end opening through which the contaminated liquid is discharged, a settling chamber circumferentially of said electrocoagulation chamber and said opening thereof for receiving the liquid from the electrocoagulation chamber, an outlet pipe for removing purified liquid from the settling chamber, a system of energizable insoluble electrodes internally of the settling chamber, a distributor at an upper end of the settling chamber above the level of the system of insoluble electrodes circumferentially of said opening in communication therewith for receiving liquid from the electrocoagulation chamber and having orifices evenly distributed about said opening for uniformly distributing of the liquid from the electrocoagulation chamber into the settling chamber and conduits to allow foam to pass therethrough.

2. An apparatus for electrochemical purification of contaminated liquid according to claim 1, including, means in registry with said opening for receiving foam on the liquid from the electrocoagulation chamber and discharging it from the apparatus.

3. An apparatus for electrochemical purification of contaminated liquid according to claim 1, wherein said outlet pipe is located below the level of the insoluble electrodes.

4. An apparatus for electrochemical purification of contaminated liquid according to claim 3, including means for removing sludge from a lower part of the settling chamber.

5. An apparatus for electrochemical purification of contaminated liquid according to claim 1, including conduit means for removing contaminants from the surface of the liquid in the settling chamber, the conduit means being in communication with the settling chamber below and adjacent to the distributor.

6. An apparatus for electrochemical purification of contaminated liquid according to claim 1, in which said distributor comprises two baffle plates spaced in an axial direction, said conduits extending between and through the baffle plates to provide passages for flow of liquid axially through the distributor, the lower one of the baffle plates having orifices disposed between the conduits distributed uniformly with the conduits, the lower one of the baffle plates being disposed circumferentially of the electrocoagulation chamber below the level of said opening thereof, the upper one of the baffle plates having an opening in registry with the opening of the electrocoagulation chamber to allow foam to pass therethrough upwardly of the distributor.

7. An apparatus for electrochemical purification of contaminated liquid according to claim 6, including means for discharging foam from the apparatus above the distributor upper baffle plate.

* * * * *